April 18, 1939.   C. C. FARMER   2,155,221
FRICTION BRAKE
Filed April 17, 1936   3 Sheets-Sheet 1
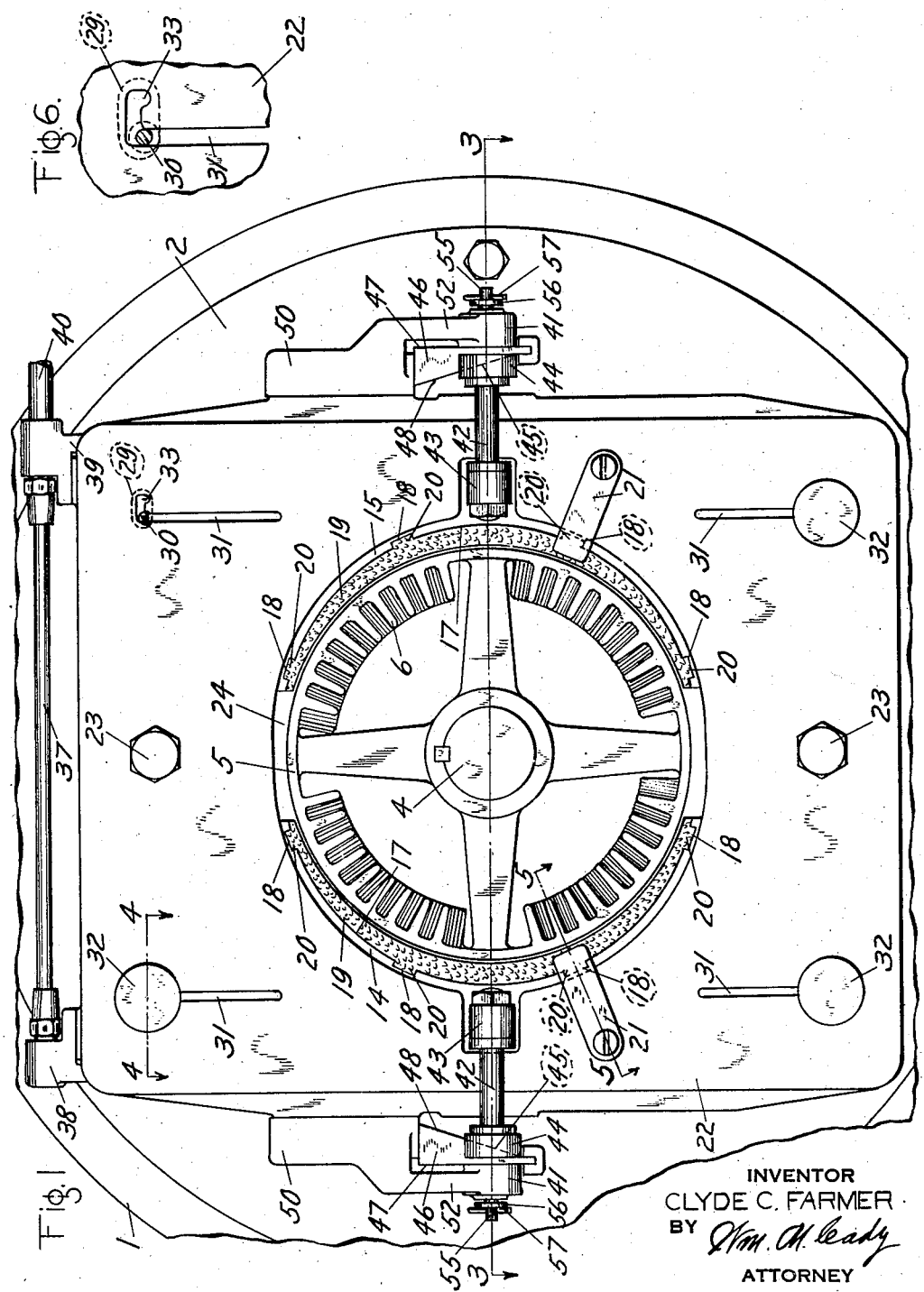
INVENTOR
CLYDE C. FARMER
BY
ATTORNEY

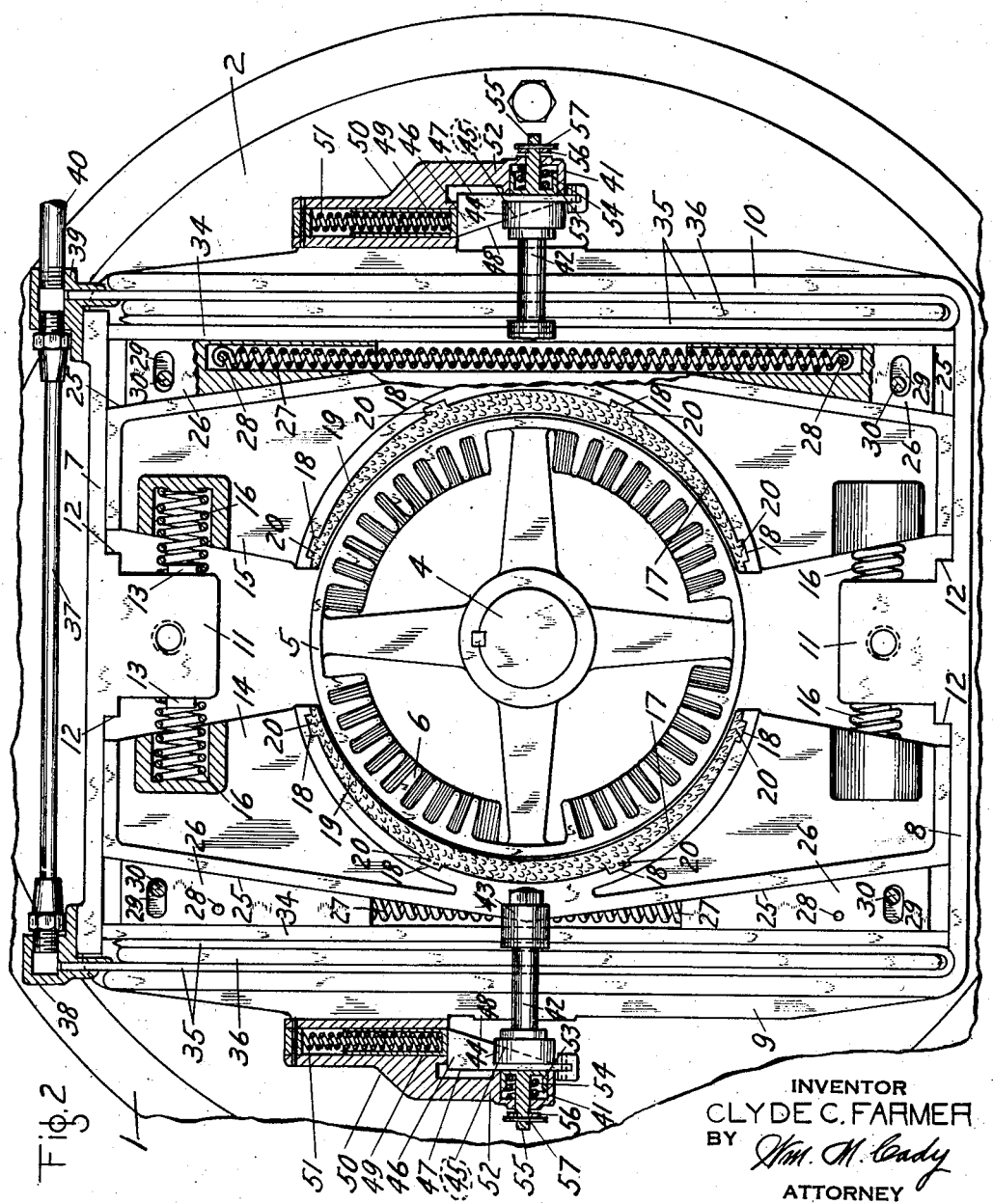

April 18, 1939.　　　　　C. C. FARMER　　　　　2,155,221
FRICTION BRAKE
Filed April 17, 1936　　　3 Sheets-Sheet 3
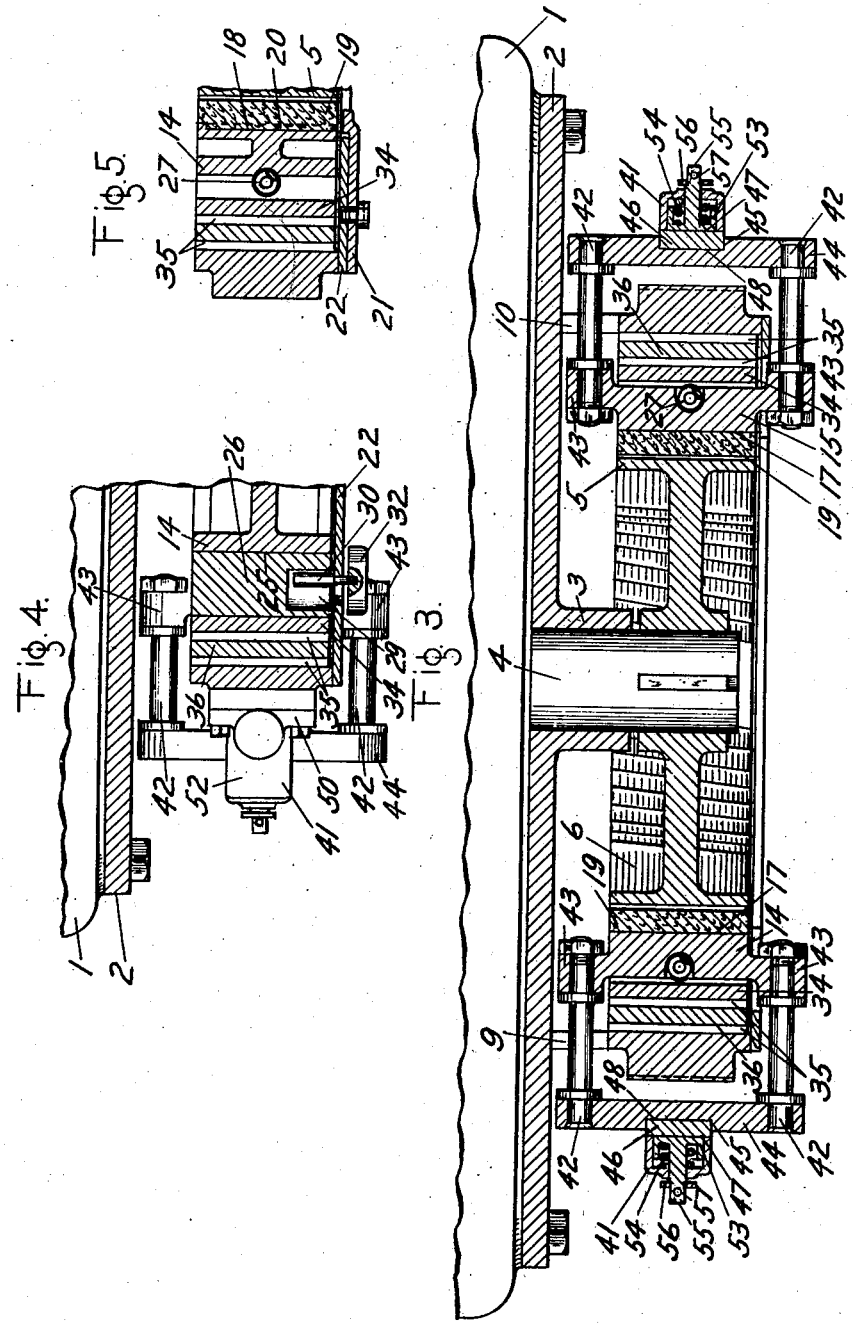
INVENTOR
CLYDE C. FARMER
BY *Wm. M. Ready*
ATTORNEY Patented Apr. 18, 1939

2,155,221

UNITED STATES PATENT OFFICE 2,155,221

FRICTION BRAKE

Clyde C. Farmer, Pittsburgh, Pa., assignor to The Westinghouse Air Brake Company, Wilmerding, Pa., a corporation of Pennsylvania Application April 17, 1936, Serial No. 74,832

5 Claims. (Cl. 188—79.5)

This invention relates to brake apparatus and more particularly to fluid pressure brake apparatus of that type in which a fluid pressure responsive expansible tube is employed for moving a brake shoe into braking engagement with a brake drum or other rotatable member to be braked.

The principal object of the invention is to provide an improved fluid pressure brake apparatus of the above defined type.

Another object of the invention is to provide a fluid pressure brake apparatus of the above defined type with a slack adjuster which operates automatically as the brake shoe wears to compensate for such wear so that in releasing the brakes after each application the clearance space between the braking faces of the shoe and brake drum will be uniform regardless of the wear of the brake shoe.

Other objects and advantages will appear in the following more detailed description of the invention.

As shown in the accompanying drawings, Fig. 1 is an end elevational view of a brake apparatus embodying the invention; Fig. 2 is a similar view with a cover plate of the apparatus removed and several parts shown in section to more clearly illustrate certain features of the invention; Fig. 3 is a cross-sectional view of the apparatus taken on the line 3—3 of Fig. 1; Fig. 4 is a fragmentary sectional view taken on the line 4—4 of Fig. 1; Fig. 5 is a fragmentary sectional view taken on the line 5—5 of Fig. 1; and Fig. 6 is a fragmentary face view of the upper right hand corner of Fig. 3 but drawn on an enlarged scale to more clearly illustrate certain details.

In the drawings, the improved brake apparatus is illustrated in conjunction with an electric driving motor for railway vehicles, but it will be understood that the invention is not limited to this for it is contemplated employing the apparatus in combination with brake drums carried by any rotatable elements.

As shown the electric motor may comprise a motor frame or housing 1 which may be mounted on a railway vehicle in the usual manner. Secured to one end of the motor housing 1 is a bearing member 2 having an outwardly extending bearing portion 3 in which one end of the armature shaft 4 of the motor is journalled. The shaft 4 extends beyond the outer end of the bearing portion 3 and, adjacent the outer end of the bearing portion, has secured thereto so as to rotate therewith, a brake drum 5, which drum, in the present embodiment of the invention is in the form of a spoked wheel having a plurality of spaced angularly disposed cooling fins 6 projecting inwardly from the inner surface of the rim of the wheel.

Projecting outwardly from the member 2 and preferably integral therewith is a rectangular flange having spaced horizontally disposed parallel top and bottom portions 7 and 8, respectively, and spaced vertically disposed parallel left and right hand side portions 9 and 10, respectively.

Extending inwardly from and preferably integral with each of the top and bottom flange portions 7 and 8 of the member 2 is a lug 11 having at each side and adjacent the flange portion a stop shoulder 12 and also having at each side and near its end a short laterally extending spring retaining lug 13.

The apparatus also comprises brake shoes 14 and 15 which are disposed in clasp arrangement about the brake drum 5, the brake shoe 14 being arranged at one side of the drum and the shoe 15 being arranged at the opposite side of the drum. The brake shoes are spaced apart and are movable into and out of engagement with the drum, each shoe being slidably guided at its ends by the top and bottom flange portions 7 and 8, respectively, of the member 2.

Interposed between and operatively engaging each end of each shoe and one side of the adjacent lug 11 is a release spring 16, each pair of which springs is for the purpose of moving the associated brake shoe to release position as will hereinafter more fully appear.

The front face 17 of each brake shoe, intermediate the ends of the shoe, is of concave arcuate form and has formed therein radially arranged cross grooves 18 which are closed at the rear side of the shoe and open at the opposite side of the shoe.

Each brake shoe is lined with a molded brake lining or block 19 having its braking face curved to correspond to the curvature of the braking surface of the brake drum 5 and having its opposite face curved to fit snugly the face 17 of the brake shoe. The brake block is molded out of any suitable friction composition and is made sufficiently hard and rigid to withstand the high compressive forces and heat to which it is adapted to be subjected in service.

Integral with the block 19 and extending outwardly from the convex surface thereof are spaced radially arranged lugs 20 which are adapted to be received in the accommodating grooves 18 in the brake shoe. It will here be noted that lugs 20 are so engaged within the grooves 18 by the brake shoe that the only way the block can be removed from or applied to the shoe is by sliding it transversely across the face 17 of the shoe. Since the grooves 18 are closed at the rear side of the brake shoe the block 19 cannot move relative to the shoe in this direction. To prevent the block from moving in the opposite direction relative to the shoe a stop 21 is provided which is removably secured to a cover plate 22 secured to the lugs 11 by means of bolts 23.

The cover plate 22 is provided with an opening 24 whereby the brake drum 5 and brake blocks 19 are easily accessible from the exterior of the apparatus and through which either the drum or brake blocks or both may be removed or replaced without removing any other operating parts of the apparatus. When the brake blocks are to be removed the stops 21 will of course either be removed or moved out of the path of travel of the block as it is being removed. It will be seen that since the brake blocks are secured to the shoes without passing screws or rivets through the blocks, the blocks may be readily removed or replaced without having to remove the brake shoes or associated operating parts. Another very important feature of this construction is that there are no metal parts embedded in the blocks which might score the brake drum as the blocks wear, thus reducing to a minimum the possibility of damage to the drum.

It is obvious that the amount of wear on each brake block will be greatest at a point midway between the ends of the block and that such wear will taper off toward the ends of the block. In view of this and in order to effect a saving in the composition out of which the brake block is molded, the block is made of crescent shape so that the thickness thereof varies according to the amount of wear which will occur, that is to say, the block tapers from its thinnest portions at its ends, where the minimum amount of wear occurs, to its thickest portion intermediate its ends where the maximum amount of wear occurs.

The back of each brake shoe is provided with oppositely inclined faces 25 which diverge from a point intermediate the ends of the shoe toward opposite ends of the shoe, which faces are operatively engaged by correspondingly inclined faces of wedge members 26 which are spaced longitudinally of the shoe and which when the brake block 19 wears, as will hereinafter appear, are movable toward each other relative to the shoe by the action of a coil spring 27 which is secured at one end to one wedge member by means of a pin 28 and at the other end to the other wedge by means of a similar pin 28.

Each wedge member 26 is provided with an elongated recess 29 which receives the inner end of a reset pin 30 which moves with the wedge and which extends through a slot 31 in the cover plate 22, the outer end of the pin being provided with a head 32 whereby the pin may be operated to its reset position. The major portion of the slot 31 extends vertically of the cover plate but at its outer end extends laterally a short distance toward the adjacent side of the plate, the laterally extending portion of the slot providing at its outer end a notch 33 in which the reset pin is adapted to rest when, as will hereinafter appear, a new brake block 19 is substituted for one that is worn.

The rear faces of each pair of wedge members 26 are vertically disposed and are operatively engaged by a vertically disposed follower plate 34 which is slidably guided at its upper and lower ends by the flange portions 7 and 8, respectively, of the member 2 to move in directions toward and away from the brake drum 5.

Interposed between the follower plate 34 and the adjacent side flange portion 9 or 10 of the member 2, as the case may be, is a fluid pressure responsive mechanism for moving the brake shoes into braking engagement with the brake drum 5. In the present embodiment of the invention this mechanism comprises an expansible metal tube 35 which is folded once to provide two connected expansible diaphragms, the outer fold operatively engaging the adjacent vertically disposed flange portion of the member 2 and the inner fold operatively engaging the follower plate 34. The folds of the tube are separated from each other by means of a movable follower plate 36.

The open ends of the outer layers of the two metal tubes 35 are connected together through a pipe 37, an elbow 38 and a T 39, the T 39 establishing communication from an application and release pipe 40 to one tube 35 and to the pipe 37 leading to the other tube 35.

Each brake shoe has associated therewith a lost motion clearance device 41 which is adapted to function to maintain the clearance space between the braking faces of the brake block and brake drum 5 uniform after each application of the brakes regardless of the amount the brake block wears. It will here be noted that while the device maintains the clearance space between the braking faces of the brake block and drum uniform when the brakes are released after each application, the wedge members 26 function to take up the space between the back of the brake shoe and the follower plate 34 when the brake shoe is in its release position, all of which will hereinafter more fully appear.

Each lost motion clearance device comprises spaced parallel bolts 42 which extend in a direction transversely of the apparatus and which at their inner ends are secured by means of nuts to lugs 43 extending outwardly from opposite sides of the brake shoe. The outer ends of these bolts are connected together a short distance outwardly beyond the adjacent flange portion of the member 2 by a crossbar 44, which bar is provided in its outer face with an outwardly opening vertically extending groove 45, the bottom of the groove sloping downwardly and outwardly.

Contained in the groove 45 is a vertically disposed adjusting wedge member 46 having an outer vertical face 47 and an inner face 48 which engages the bottom of the groove 45 and which slopes downwardly and outwardly to correspond to the slope of the bottom of the groove 45. The upper end of the wedge member 46 is operatively engaged by a plunger 49 slidably mounted in a bracket 50 secured to the adjacent side flange portion of the member 2. Interposed between and operatively engaging the plunger 49 and bracket 50 is a spring 51 which acts through the medium of the plunger to exert a downwardly directed pressure on the wedge member 46.

The bracket 50 is provided with a downwardly depending arm 52 in which there is slidably mounted a plunger 53 which is normally urged into frictional engagement with the vertical face 47 of the wedge member 46 by the action of a spring 54. The plunger 53 is provided with a central stem 55 which extends through an opening in the arm 52 and adjacent its end is provided with an annular stop washer or collar 56 which may be held in place on the stem by means of a cotter pin 57. With the brakes released as shown in Fig. 2, the clearance space between the inner face of the washer or collar 56 and the outer surface of the arm 52 will correspond exactly with the clearance space between the braking faces of the brake block and brake drum.

*Operation to effect an application of the brakes*

When it is desired to effect an application of the brakes, fluid under pressure is supplied to the application and release pipe 40 and consequently to both expansible metal tubes 35.

Fluid under pressure thus supplied to the tubes 35 causes the several layers thereof to expand and, through the medium of the follower plates, wedge members 25, and brake shoes force the brake blocks 19 into braking engagement with the brake drum 5.

When the brake blocks are in braking engagement with the brake drum and wear of the brake blocks occurs, both lost motion clearance devices 41 will function to compensate for such wear and since the operation of both devices will be substantially the same, the following description will be limited to the operation of a single device.

As the brake shoe and brake block move inwardly toward the brake drum 5, the bolts 42, cross bar 44, wedge member 46 and plunger 53 move in unison with the brake shoe, the spring 54 acting to maintain the plunger 53 in frictional engagement with the wedge member 46 and thereby the wedge member in frictional engagement with the bottom of the groove 45 of the cross bar. It will here be understood that the value of the spring 54 is such as to maintain the frictional resistance of the wedge member 46 high enough to prevent the spring 51 from acting to force the wedge member downwardly.

When the brake block is in braking engagement with the brake drum the washer 56 will be in engagement with the adjacent outer surface of the arm 52 and the cotter pin 57 will be in engagement with the outer face of the washer so that further movement of the plunger in a direction toward the brake drum is not permitted.

Now as the brake block wears the brake shoe and consequently the cross bar 44 moves toward the brake drum. Since the plunger 53 cannot move further in this direction, the space between the cross bar 44 and the plunger is increased, and as a consequence the frictional resistance of the wedge member to downward movement is so reduced that the spring 51 is permitted to move the wedge member 46 downwardly. This downward movement of the wedge member 46 will of course be very slight but will continue so long as wear is occurring. However, when the drum ceases to rotate and wear of the brake block is no longer occurring the wedge member will be brought to a stop since the value of the spring 51 is not sufficient to cause the wedge member to move the plunger 53 inwardly against the opposing pressure of the spring 54. As long as the brake block is in engagement with the brake drum the tube 35 will continue to expand as wear of the brake block occurs and due to this the wedge members 26 will not be caused to move toward each other to take up slack between the tube 35 and the back of the brake shoe, such take up action occurring only in effecting the release of the brakes as will hereinafter appear.

*Release of the brakes*

When it is desired to effect the release of the brakes, fluid under pressure is released from the application and release pipe 40 and consequently from the expansible tube 35.

The tube, as fluid under pressure is released therefrom, contracts, thereby permitting the release springs to act to move the brake shoe and brake block toward release position. The bolts 42, cross bar 44, adjusting wedge 46 in its adjusted position, and plunger 53 of the slack adjusting mechanism move in unison with the brake shoe, and when the vertical face 47 of the wedge is engaged by the arm 52 of the bracket 50 the brake shoe will, due to such engagement be brought to a stop in its release position, in which the clearance space between the braking faces of the brake block and brake drum will, regardless of wear, be the same as the original clearance space between these faces.

Since the lost motion clearance device does not permit the brake shoe to move to its original release position but stops it short of said position by a distance equal to the wear of the brake block, the continued contraction of the tube 35 to its full release condition will increase the distance between the back of the brake shoe and the tube an amount equal to the wear of the brake block. As the tube contracts and the distance between the brake shoe and the tube increases, the spring 25 acts to draw the wedge members 26 toward each other, said wedge members, as they are thus moved, cooperating with the sloping back surfaces 25 of the brake shoe and with the follower plate 34 and thereby the tube 35 to provide a solid operative connection between the tube and brake shoe.

From the foregoing description it will be apparent that each time an application of the brakes is effected and while the brake blocks are in engagement with the brake drum 5, the lost motion clearance devices automatically operate to take up slack due to wear of the brake blocks and does this regardless of how slight the wear may be, so that upon releasing the brakes after each application the clearance space between the braking faces of the brake blocks and the brake drum will be uniform. It will also be apparent that upon the release of the brakes slack between the tubes 35 and the brake shoes, due to the adjustment of the shoes effected by the mechanisms 41, will be automatically taken up. By thus taking up the slack in the apparatus by means of the devices 41 and the wedges 26 the required amount of expansion required to effect an application of the brakes is kept down to a minimum.

*Relining brake shoes*

When the brake blocks 19 are worn to such an extent that the ends of the brake shoes stop against the shoulders 12 in effecting an application of the brakes the brake shoes must be relined with new brake blocks. In order to do this the operator, by the use of the buttons 32, moves each the pins 30 upwardly or downwardly as the case may be toward the outer end of a slot 31 until the pin comes to a stop by reason of its engagement with the upper end of the slot and then moves the pin laterally until it drops into the notch 33. The pin as it is moved along the slot 31 moves the associated wedge member 26 to its original position as shown in Fig. 2 and when the pin is moved laterally relative to the wedge member into the notch 33, the wedge member will be positively held in the position to which it has been moved.

When each wedge member has been positioned as just described the adjusting wedge member 46 of each slack adjusting mechanism is driven upwardly to the position in which it is shown in Figs.

1 and 2 which permits the release springs 16 to act to return the brake shoes to their original positions in which they are shown in the drawings.

The stop members 21 are now removed or swung clear of the opening 24 in the cover plate 22. The worn brake blocks are now slipped out of the brake shoes by way of the opening 24 and new ones slipped in place, after which the stop members 21 are secured in their stop positions as shown in Figs. 1 and 5.

The pins 30 are now moved out of the notches 33 and moved to the position as shown in Fig. 6 so that the wedges will be drawn to their proper positions as shown in Fig. 2. The apparatus is now in condition to function to apply and release the brakes and to take up slack in the manner hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake apparatus, in combination, a member to be braked, a brake element adapted to be moved into braking engagement with said member, means for moving said element into engagement with said member, a bracket fixed relative to said element, a plurality of cooperating lost motion take-up members movable with said element and one being movable relative to the other to take up lost motion as wear occurs between said member and element, and means carried by said bracket adapted to move a limited distance with said lost motion take-up members and during such movement being adapted to prevent relative movement between the lost motion take-up members and to thereafter permit such relative movement upon movement of one of the lost motion take-up members relative to the means by said element as wear occurs between the element and member.

2. In a brake apparatus, in combination, a member to be braked, a brake element adapted to be moved into braking engagement with said member, means for moving said element into engagement with said member, a bracket fixed relative to said element, a lost motion take-up member carried by said element and movable thereby, a wedge member adapted to move with said lost motion take-up member and being movable relative to said lost motion take-up member to take up slack as said element wears, means carried by said bracket adapted to prevent the wedge member from moving relative to said lost motion take-up member until wear of said element occurs, and means operative upon the release of the brakes following the lost motion take-up operation of said lost motion take-up members for taking up the lost motion in the means for moving said element.

3. In a brake apparatus, in combination, a member to be braked, a brake element adapted to be moved into braking engagement with said member, means for moving said element into engagement with said member, a bracket fixed relative to said element, a plurality of cooperating lost motion take-up members movable with said element and one being movable relative to the other to take up lost motion as wear occurs between said member and element, and means carried by said bracket adapted to move a limited distance with said lost motion take-up members and during such movement being adapted to prevent relative movement between the lost motion take-up members until wear occurs between said element and member.

4. In a brake apparatus, in combination, a member to be braked, a brake element adapted to be moved into braking engagement with said member, means for moving said element into engagement with said member, a bracket fixed relative to said element, a lost motion take-up member carried by said element and movable thereby, a wedge member adapted to move with said lost motion take-up member and being movable relative to said lost motion take-up member to take up slack as said element wears, means carried by said bracket adapted to prevent the wedge member from moving relative to said lost motion take-up member until wear of said element occurs, means for moving said wedge relative to said lost motion take-up member and means when wear of said element occurs, and wedge means included in the means for moving said element adapted to operate automatically to take up lost motion therein upon the release of the brakes following an operation of the lost motion take-up members to adjust the lost motion of said element.

5. In a brake apparatus, in combination, a member to be braked, a brake element adapted to be moved into braking engagement with said member, means for moving said element into braking engagement with said member, said means comprising a fluid pressure responsive power applying device and adjustable wedge means normally constituting a rigid power transmitting connection from said fluid pressure responsive means to said element and being movable with the element, a part fixed relative to said element and in abutting relationship with one end of said fluid pressure responsive means, a lost motion take-up member carried by said element and movable thereby, and wedge means cooperating with said fixed part and adapted to move with said lost motion take-up member and being movable relative to the lost motion take-up member and fixed part as said element wears to take up lost motion due to such wear, said adjustable wedge means being automatically operative, upon releasing the brakes, to take up the lost motion between said element and fluid pressure responsive means occasioned by the lost motion take-up operation of the lost motion take-up members.

CLYDE C. FARMER.